(12) United States Patent
Martin

(10) Patent No.: US 8,330,570 B2
(45) Date of Patent: Dec. 11, 2012

(54) SECURE KEYLESS ENTRY SYSTEM

(75) Inventor: Albert John Martin, El Dorado Hills, CA (US)

(73) Assignee: Protective Resources 316 Inc. (CA)

( * ) Notice: Subject to any disclaimer, the term of this patent is extended or adjusted under 35 U.S.C. 154(b) by 858 days.

(21) Appl. No.: 12/365,617

(22) Filed: Feb. 4, 2009

(65) Prior Publication Data

US 2009/0237204 A1    Sep. 24, 2009

Related U.S. Application Data

(60) Provisional application No. 61/063,455, filed on Feb. 4, 2008.

(51) Int. Cl.
*G08B 21/00* (2006.01)

(52) U.S. Cl. ............... 340/5.54; 340/5.64; 340/5.71; 340/5.2; 340/5.23; 380/270

(58) Field of Classification Search .............. 340/5.2, 340/5.23, 5.54, 5.64, 5.71; 380/270
See application file for complete search history.

(56) References Cited

U.S. PATENT DOCUMENTS

| | | | | |
|---|---|---|---|---|
| 4,408,251 A | * | 10/1983 | Kaplan | ............ 361/172 |
| 5,872,513 A | * | 2/1999 | Fitzgibbon et al. | ........... 340/5.28 |
| 6,031,465 A | | 2/2000 | Burgess | |
| 6,617,975 B1 | | 9/2003 | Burgess | |
| 7,106,171 B1 | | 9/2006 | Burgess | |
| 7,142,849 B2 | | 11/2006 | Neuman | |
| 2003/0102836 A1 | * | 6/2003 | McCall | ............ 318/445 |
| 2005/0151622 A1 | * | 7/2005 | McMahon | ............ 340/5.61 |
| 2005/0242923 A1 | | 11/2005 | Pearson et al. | |
| 2007/0250920 A1 | * | 10/2007 | Lindsay | ............ 726/7 |

FOREIGN PATENT DOCUMENTS

WO         95/15663        6/1995

* cited by examiner

*Primary Examiner* — Jennifer Mehmood
*Assistant Examiner* — Mark Rushing
(74) *Attorney, Agent, or Firm* — Steven M. Greenberg, Esq.; Carey, Rodriguez, Greenberg & O'Keefe, LLP

(57) ABSTRACT

A secure keyless entry system integrates into an existing motorized garage door opening system to replace the one button transmitters typically placed in a vehicle. The one button transmitters are replaced with remote modules having alpha numeric key pads. The remote modules accept a string of input and compare the last four to eight entries to a previously set designated PIN. In order to obfuscate the designated PIN from on lookers, a user of the system may first enter a random string of decoy characters before finally entering the designated PIN. The disclosed system may also be used to replace the metal keys typically used to secure entry doors to a dwelling.

5 Claims, 3 Drawing Sheets

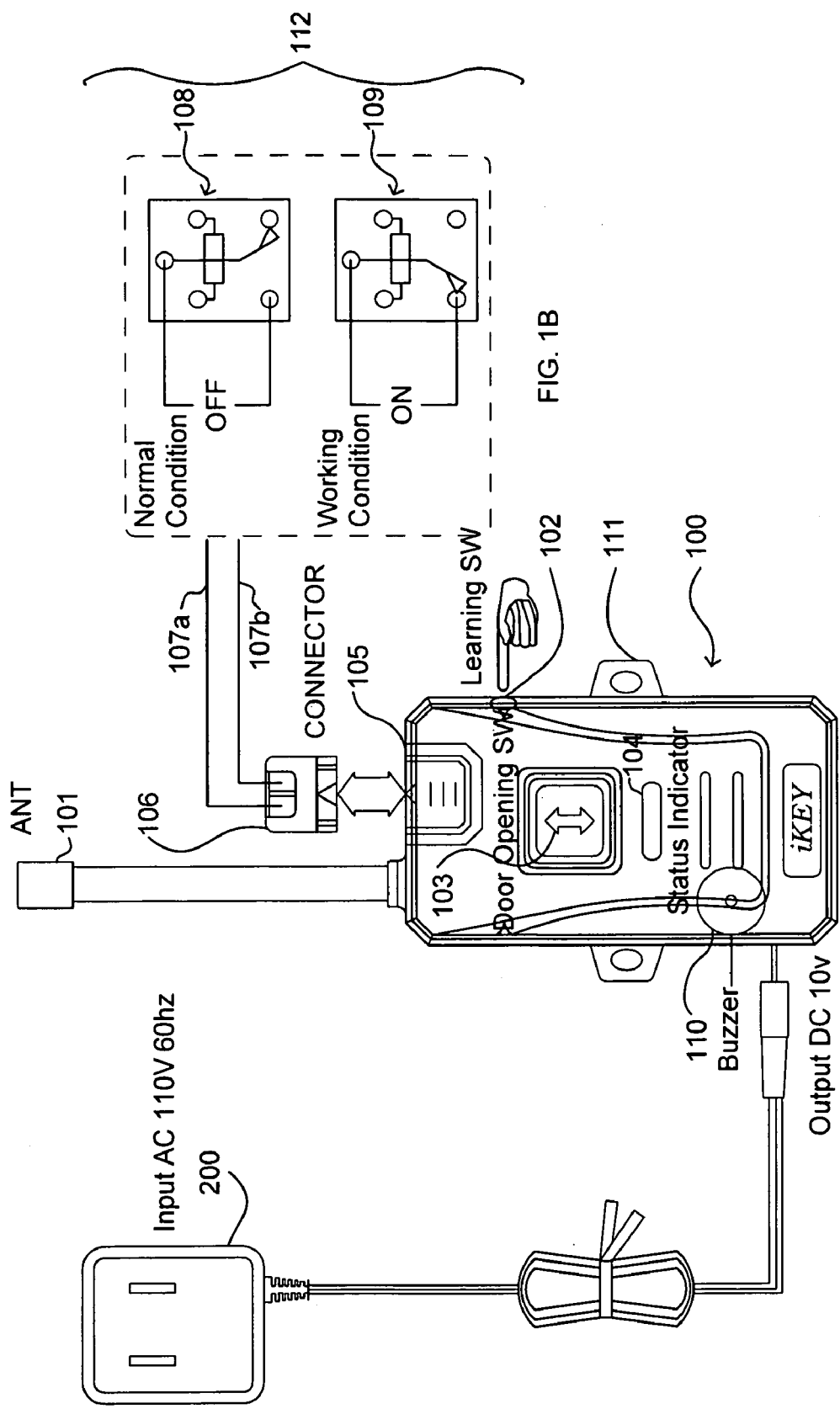

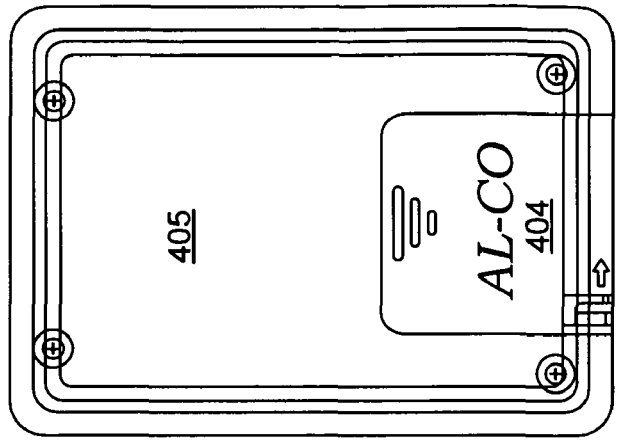
FIG.10
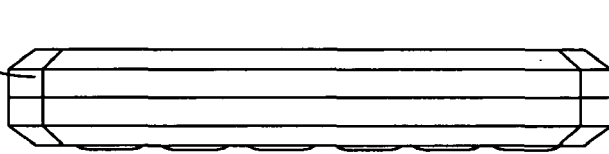
FIG. 8
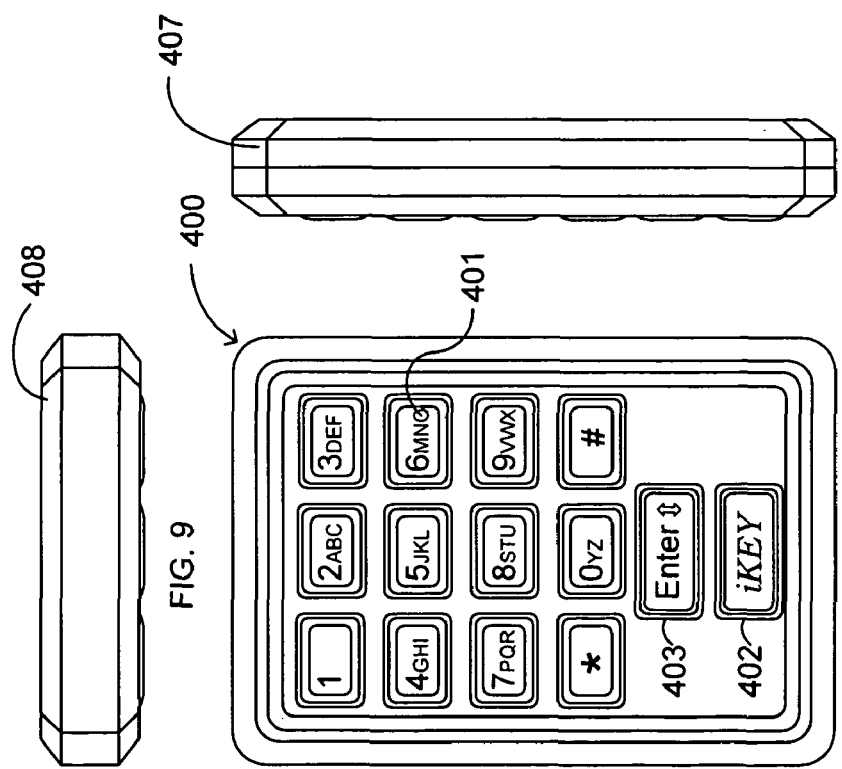
FIG. 9
FIG. 11
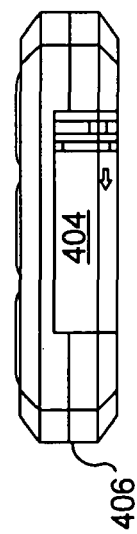
FIG. 7

SECURE KEYLESS ENTRY SYSTEM

RELATED PATENT APPLICATION AND INCORPORATION BY REFERENCE

This is a utility application based upon U.S. patent application Ser. No. 61/063455, entitled "Mini auto keyless entry remote control," filed on Feb. 4, 2008. This related application is incorporated herein by reference and made a part of this application. If any conflict arises between the disclosure of the invention in this utility application and that in the related provisional application, the disclosure in this utility application shall govern. Moreover, the inventor(s) incorporate herein by reference any and all patents, patent applications, and other documents hard copy or electronic, cited or referred to in this application.

COPYRIGHT AND TRADEMARK NOTICE

This application includes material which is subject to copyright and/or trademark protection. The copyright and trademark owner(s) has no objection to the facsimile reproduction by any of the patent disclosure, as it appears in the Patent and Trademark Office files or records, but otherwise reserves all copyright and trademark rights whatsoever.

BACKGROUND OF THE INVENTION (1) Field of the Invention

The invention relates to means and methods of securing garage doors and securing other means of entering a building. More particularly, the invention relates to the use of PIN codes, means of integration with existing garage control technology, access code or PIN decoy methods and time delay parameters.

(2) Description of the Related Art

In the related art, garage doors are typically controlled with a hand held remote radio unit comprising an unsecured control button. The unsecured one button technology of the related art has lead to thousands of preventable home burglaries, home invasions and horrific assaults within U.S. homes. Today's sophisticated organized crime organizations are known to compromise valet stations, steal one button garage control units, view vehicle registration information to find the home where the garage door opener will operate, and then drive to the victim's home to commit serious crimes. Children left with a babysitter are especially vulnerable to this method of attack as the parents are away from home and unaware of the theft of their one button garage door opener.

In light of the increase in home foreclosures a shortfall in the art has arisen as many homeowners destroy their garage door opener out of spite to the foreclosing lender. A subsequent purchaser of the home is currently forced to purchase an expensive universal garage door opener or contact the original garage door manufacturer to purchase a replacement controller at an expensive price. There is also a shortfall in the related art as home owners take and retain their original garage door openers, and after foreclosure, return to vandalize their past homes in retaliation for perceived wrongs inflicted by the foreclosing lender.

Typical metal lock keys of the related art have also lead to solo criminals and organized crime organizations to steal keys found in or near a vehicle and then travel to the address printed on the vehicle's registration information. Metal lock keys are typically given to children who will inevitably misplace the keys. Due to the high cost of rekeying locks of the related art, most homes are left in a vulnerable state after the loss of a key.

House keepers are typically given keys to a home and retain the keys after finishing their work. Such house keepers are prime targets for surveillance and subsequent robbery. A criminal who has observed the work route of a housekeeper will have no problem matching stolen keys to the appropriate home.

In light of the many shortfalls of the related art, there is ample room in the art for improved means and methods of securing garage doors and other doors giving entry into home or other buildings.

BRIEF SUMMARY OF THE INVENTION

The present invention overcomes shortfalls in the related art by presenting an unobvious and unique combination and configuration of PIN codes, means of integration with existing garage control technology, means of integration with existing home door technology, time delay parameters, access code decoy methods and other features to create new and unexpected results is safety and security.

An embodiment of the invention comprises a wall receiver, or sometimes referred to a control module, a method of syncing the codes of the existing electronic garage door opening mechanism to the control module of the present invention, a method of programming the remote control unit of the present invention, a method of quickly deleting a password from the memory of the control module, a method of entering false password information prior to entering the correct password information, a method of reversing the direction of a moving garage door by use of predefined timing parameters, and a method of disabling a remote opener after input of several incorrect strings of digits.

The invention includes means and methods of integrating a control module into an existing traditional interior garage door opening system. The disclosed control module may be integrated to replace the typical one button system of the prior art, or may be integrated to work in tandem with an existing one button system. One embodiment of the invention includes a separate protective housing for mounting the control module to an interior surface of the garage.

One embodiment of the invention includes a time parameter system or method to allow for quick reuse of the control module without reentering a PIN (Personal Identification Number). After a user has entered the correct PIN, the remote module may be used for a predefined period of time without reentering the PIN.

One embodiment of the invention includes a method of changing PINs based upon the visiting schedule of housekeepers or others who have been loaned remote modules. The invention overcomes the problem of children losing traditional metal keys, as an embodiment of the invention may be used to secure entry doors and other doors leading into a home. In the event a child losses a remote unit of the present invention, the access code may be changed and a new remote unit issued to the child.

In the prior art, keypads were mounted outside of an entry door. An externally mounted key pad is prone to accumulate body oil upon keys used to enter a designed PIN. Thus, a burglar could determine the keys used in the designed PIN by carefully looking at a worn keypad. The present invention, overcomes this shortfall in the art by providing a non mounting remote module that is kept with a home owner and not displayed to potential burglars.

In order to thwart the efforts of acquaintances who may "shoulder surf" while a homeowner is entering a PIN, an embodiment of the invention allows for the use of false strings of numbers entered into the remote module prior to entry of the legitimate PIN. The use of a "false start string" helps to confuse acquaintances who may watch numerous operations of the remote module and yet never understand or discern the real PIN. In one embodiment, the remote module does not process an entered string until an "enter" button is pressed, wherein the last four to eight digits are compared to the designed PIN, previously set by the dwelling owner.

DETAILED DESCRIPTION OF EMBODIMENTS OF THE INVENTION

The following detailed description is directed to certain specific embodiments of the invention. However, the invention can be embodied in a multitude of different ways as defined and covered by the claims and their equivalents. In this description, reference is made to the drawings wherein like parts are designated with like numerals throughout.

Unless otherwise noted in this specification or in the claims, all of the terms used in the specification and the claims will have the meanings normally ascribed to these terms by workers in the art.

Unless the context clearly requires otherwise, throughout the description and the claims, the words "comprise," "comprising" and the like are to be construed in an inclusive sense as opposed to an exclusive or exhaustive sense; that is to say, in a sense of "including, but not limited to." Words using the singular or plural number also include the plural or singular number, respectively. Additionally, the words "herein," "above," "below," and words of similar import, when used in this application, shall refer to this application as a whole and not to any particular portions of this application.

The above detailed description of embodiments of the invention is not intended to be exhaustive or to limit the invention to the precise form disclosed above. While specific embodiments of, and examples for, the invention are described above for illustrative purposes, various equivalent modifications are possible within the scope of the invention, as those skilled in the relevant art will recognize. For example, while steps are presented in a given order, alternative embodiments may perform routines having steps in a different order. The teachings of the invention provided herein can be applied to other systems, not only the systems described herein. The various embodiments described herein can be combined to provide further embodiments. These and other changes can be made to the invention in light of the detailed description.

All the above references and U.S. patents and applications are incorporated herein by reference. Aspects of the invention can be modified, if necessary, to employ the systems, functions and concepts of the various patents and applications described above to provide yet further embodiments of the invention.

These and other changes can be made to the invention in light of the above detailed description. In general, the terms used in the following claims, should not be construed to limit the invention to the specific embodiments disclosed in the specification, unless the above detailed description explicitly defines such terms. Accordingly, the actual scope of the invention encompasses the disclosed embodiments and all equivalent ways of practicing or implementing the invention under the claims.

While certain aspects of the invention are presented below in certain claim forms, the inventors contemplate the various aspects of the invention in any number of claim forms. Accordingly, the inventor(s) reserve the right to add additional claims after filing this application to pursue such additional aspects of the invention.

BRIEF DESCRIPTION OF THE DRAWINGS

FIG. 1A is a plan view showing one embodiment of a control module and power supply.

FIG. 1B is a schematic view of wiring configurations of an "on" state and an "off" state.

FIG. 7 is a plan view of the bottom edge of a remote module.

FIG. 8 is a plan view of a side edge of a remote module.

FIG. 9 is a plan view of a top edge of a remote module.

FIG. 10 is a plan view of a back side of a remote module.

FIG. 11 is a plan view of a front side of a remote module.

Figure 4:
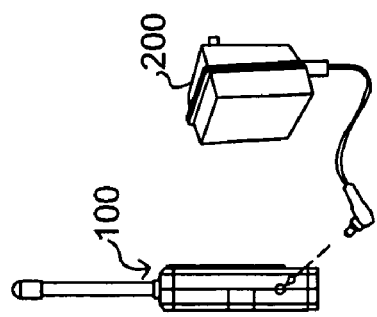
FIG. 4 is an elevation view of an encased control module and power source.

REFERENCE NUMERALS IN THE DRAWINGS 100 control module in general
101 antenna of control module
102 learning switch of control module
103 door opening switch of control module
104 status indicator light of control module
105 female connector assembly of control module
106 male connector assembly for insertion into control module and connection to existing interior garage door button wiring
107(a) wire from existing interior garage door button wiring
107(b) wire from existing interior garage door button wiring
108 switch of existing interior garage door button shown in off position or normal condition
109 switch of existing interior garage door button shown in on position or working condition
110 buzzer of control module
111 rabbit ear attachment point of control module, fastening screws 301 are used to fill void within rabbit ear attachment points and secure control module to interior of garage wall
112 door opener switching assembly
200 electrical adapter for use in standard U.S. electrical socket, the electrical adaptor may be connected to the control module
300 outer case in general, may be used to cover the control module 100
301 screws used to connect outer case 300 to interior of a garage wall
302 wire securing screws used to secure wires 107(a) and 107(b) to the outer case
303 voids within the inner side of the outer case, used to accept wire securing screws 302 and wires 107(a) and 107(b)
304 voids within upper and lower sections of outer case 300
400 remote module in general

401 alpha numeric key pads of remote module

402 optional branding insignia, in one embodiment, "iKEY" is used

403 keypad marked "enter"

404 battery replacement cover located on bottom edge and back side of remote module

405 back side surface of remote module

406 bottom edge of remote module

407 side edge of remote module

408 top edge of remote module

Referring to FIG. 1A, the control module is shown generally as 100 and comprises an antenna 101, a learning switch 102, door opening switch 103, status indicator 104, female connector assembly 105, buzzer 110, and rabbit ears 111. An electrical adaptor 200 may be connected to the control module 100 and supply power.

Referring to FIG. 1B, a male connector 106 may be fitted into the female connector assembly 105 to connect wires 107(*a*) and 107(*b*) to a door opener switching assembly 112. The door opener switching assembly 112 may be in an "off" or "normal condition" 108 or may be in an "on" or "working condition" 109.

Figure 2:
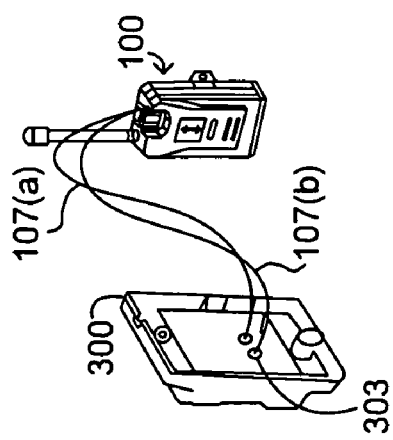
FIG. 2 is a perspective view of a protective casing and control module with a wiring configuration.

Referring to FIG. 2, wires 107(*a*) and 107(*b*) connect to the control module 100 via male connector assembly 106, (shown in FIG. 1). The other ends of wires 107(*a*) and 107(*b*) may be inserted through voids 303 of the inner side of the outer case 300, the wires may then be secured into place by use of wire securing screws 302.

Figure 3:
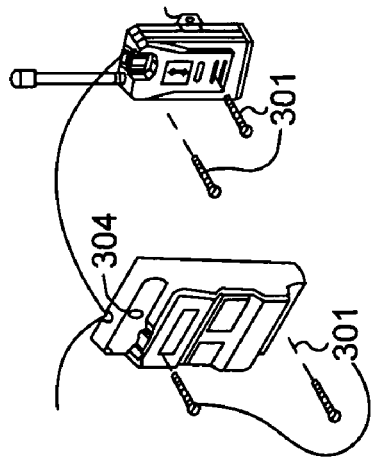
FIG. 3 is a perspective view of a protective casing and control module with a fastener configuration.

Referring to FIG. 3, screws 301 are shown in position to enter voids 304 of the upper and lower sections of outer case 300. Screws 301 are shown in position to enter rabbit ear attachment points 111 of the control module 100.

Figure 6:
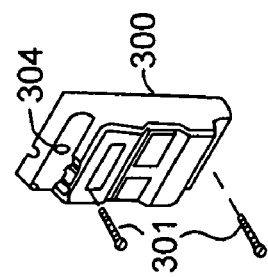
FIG. 6 is a prospective view of a protective casing with faster screws shown.
Figure 5:
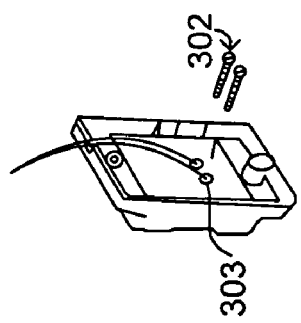
FIG. 5 is a prospective view of a protective casing with wire connection screws.

Referring to FIG. 4, an electrical adapter 200 is in position to power the control module. Referring to FIG. 5, two wire securing screws 302 are in position to secure wires 107(*a*) and 107(*b*) into voids 303 within the inner side of the outer case 300. Referring to FIG. 6, screws 301 are in position to enter voids 304 found at the upper and lower sections of outer case 300.

FIG. 7 shows a plan view of the bottom edge 406 of a remote module 400. The bottom edge of the battery replacement cover 404 is exposed while the back surface of the battery cover 404 is seen in FIG. 10. FIG. 8 shows a plan view of a side edge 407 of remote module 400. FIG. 9 shows plan view of the top edge 408 of the remote module 400.

FIG. 8 shows a plan view of the remote module 400 in general, alpha numeric key pads 401, enter pad 403 and optional logo "iKey" 402.

Embodiments of the invention include, but are not limited to the following items:

Item 1. A method of securing a door, the method comprising, a) installing a control module 100 to an existing motorized garage door opening system, the control module having means of controlling the opening and closing of an existing garage door, and the control module having means of accepting a radio frequency signal from a remote module 400 and having means of receiving a radio frequency signal from the remote module 400, the remote module 400 having means of sending and receiving radio frequency signals to and from the control module 100;

b) synchronizing the control module 100 to a code system of operation used by the existing garage door opening system;

c) synchronizing the remote module 400 to the code system of operation previously obtained by the control module 100;

d) entering a string of alpha numeric information into the remote module 400 to create a designated PIN (Personal Identification Number); and e) using the remote module 400 in a manner to obfuscate the designated PIN by entering a string of alpha numeric information not comprising the designated PIN, prior to entering the designated PIN into the remote module, the remote module having means to store and process the most current string of alpha numeric information and to ignore leading alpha numeric information.

Item 2. The method of item 1, further comprising the step of resetting the designated pin on a periodic basis so as to accommodate the use of a remote module 400 by other individuals who are scheduled to enter a protected dwelling on a scheduled basis.

Item 3. The method of item 1 further comprising the step of using a pound key or other designated key to trigger the remote module to process the most current string of entered alpha numeric information to determine if the current string of entered alpha numeric information matches the designated PIN.

Item 4. A system for securing garage doors and other doors of entry into a dwelling, after a foreclosure or other involuntary repossession of the dwelling, the system comprising:

a) a control module 100, having means of:
  i) integration into an existing motorized garage door opener system by use of and connection to two interior garage door button wires 107(*a*) & 107(*b*);
  ii) replacing an existing interior garage door button;
  iii) wireless communication with a remote module 400;
  iv) synchronization with the code control system of an existing motorized garage door opener system;

b) the control module comprising:
  i) an antenna 101, learning switch 102, door opening switch 103, status indicator light 104, female connector assembly 105 to accept a male connector assembly 106, with the male connector assembly having means to retain and connect with two existing wires 107(*a*) & 107(*b*) of the existing interior garage door button wiring, and wherein the door opening switch 103 rests in a off position or normal condition 108 so as to not activate the garage door, and wherein pressure applied to the door opening switch 103 will result in the door opening switch 103 being placed in an on position or working condition 109, so as to operate the garage door, a door opener switching assembly 112 comprising means of placing the door opening switch 103 in a on position 109 or an off position 108, two or more rabbit ear attachment points 111, and fastening screws 301;

c) an electrical adapter 200, suitable for supplying power to the control module 100;

d) a remote module 400, with an alpha numeric key pad 401, a key pad marked "enter" 403, e) the remote module 400 having means of:
  i) of wireless communication with the control module 100
  ii) accepting a designated PIN (Personal Identification Number)
  iii) operating the garage door via wireless communication with the control module 100, with such operation triggered by entry of the designated PIN with or without the prior entry of false strings used to obfuscate the designated PIN.

Item 5. The system of item 4, further comprising printed instructions suitable for use by a foreclosing lender in assembling the components of the system.

Item 6. The system of item 4, further comprising an exterior door locking assembly with means of locking and unlocking an exterior front door or other door of a dwelling, the door locking assembly having means of wireless communication with the remote module.

Item 7. The system of item 4 wherein the remote module 400 has means to execute a first command to operate a garage door after entry of a designated PIN, and means to execute a second command to operate the garage door in a reverse direction as compared to the first command, and wherein the second command will be executed without reentry of a designated PIN, as long as the second command is entered within a period of 10 to 20 seconds after the first command.

Item 8. The system of item 7 wherein two taps to the enter button 403 of the remote module 400 are required to execute the second command without reentry of the designated PIN.

Item 9. The system of item 4 wherein five incorrect entries entered into the remote module 400 will disable the system and require a synchronization of the control module 100 to the with the code control system of an existing motorized garage door opener system.

What is claimed is:

1. A system for securing garage doors and other, doors of entry into a dwelling, the system comprising:
   a) a control module, having means of:
      i) integration into an existing motorized garage door opener system by use of and connection to two interior garage door button wires;
      ii) replacing an existing interior garage door button; and
      iii) wireless communication with a remote module;
   b) the control module comprising:
      i) an antenna, learning switch, door opening switch, status indicator light, means to retain and connect with two existing wires of the existing interior garage door button wiring, and wherein the door opening switch rests in a off position or normal condition so as to not activate the garage door, and wherein pressure applied to the door opening switch will result in the door opening switch being placed in an on position or working condition, so as to operate the garage door, a door opener switching assembly comprising means of placing the door opening switch in a on position or an off position, two or more rabbit ear attachment points, and fastening screws;
   c) an electrical adapter, suitable for supplying power to the control module;
   d) a remote module, with an alpha numeric key pad, a key pad marked "enter";
   e) the remote module having means of:
      i) wireless communication with the control module;
      ii) accepting a designated PIN (Personal Identification Number);
      iii) operating the garage door via wireless communication with the control module, with such operation triggered by entry of the designated PIN with or without the prior entry of false strings used to obfuscate the designated PIN;
   wherein the remote module has means to execute a first command to operate a garage door after entry of a designated PIN, and means to execute a second command to operate the garage door in a reverse direction as compared to the first command, and wherein the second command will be executed without re-entry of a designated PIN, as long as the second command is entered within a period of 10 to 20 seconds after the first command; and
   wherein two taps to the enter button of the remote module are required to execute the second command without re-entry of the designated PIN.

2. The system of claim 1, further comprising printed instructions suitable for use by a foreclosing lender in assembling the components of the system.

3. The system of claim 1, further comprising an exterior door locking assembly with means of locking and unlocking an exterior front door or other door of a dwelling, the door locking assembly having means of wireless communication with the remote module.

4. The system of claim 1 wherein five incorrect entries entered into the remote module will disable the system and require a synchronization of the control module to the with the code control system of an existing motorized garage door opener system.

5. The system of claim 1, wherein the control module has means of synchronization with the code control system of an existing motorized garage door opener system.

* * * * *